US012640785B2

(12) United States Patent
Huang et al.

(10) Patent No.: US 12,640,785 B2
(45) Date of Patent: May 26, 2026

(54) TRANSMITTING AN UPLINK TRANSMISSION USING A PRECODING MATRIX DERIVED FROM AN ANALOG PRECODING MATRIX INDICATION

(71) Applicant: QUALCOMM Incorporated, San Diego, CA (US)

(72) Inventors: Yi Huang, San Diego, CA (US); Mostafa Khoshnevisan, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 524 days.

(21) Appl. No.: 18/153,065

(22) Filed: Jan. 11, 2023

(65) Prior Publication Data

US 2024/0235630 A1      Jul. 11, 2024

(51) Int. Cl.
| | |
|---|---|
| *H04B 7/0456* | (2017.01) |
| *H04L 5/00* | (2006.01) |
| *H04W 72/232* | (2023.01) |

(52) U.S. Cl.
CPC ......... *H04B 7/0486* (2013.01); *H04L 5/0051* (2013.01); *H04W 72/232* (2023.01)

(58) Field of Classification Search
CPC ........................... H04B 7/0486; H04W 72/232
See application file for complete search history.

(56) References Cited

U.S. PATENT DOCUMENTS

| | | | |
|---|---|---|---|
| 2018/0091197 A1* | 3/2018 | Huang ................. | H04B 7/0456 |
| 2022/0166475 A1* | 5/2022 | Park ................... | H04W 72/1268 |
| 2022/0352950 A1* | 11/2022 | Faxér ................... | H04B 7/0626 |
| 2024/0357584 A1* | 10/2024 | Gao ...................... | H04L 5/0035 |

* cited by examiner

*Primary Examiner* — Abdeltif Ajid
(74) *Attorney, Agent, or Firm* — Harrity & Harrity LLP/Qualcomm Incorporated

(57) ABSTRACT

In some implementations, a user equipment (UE) may receive, from a network node, an analog precoding matrix indication. The UE may transmit, to the network node, a physical uplink shared channel (PUSCH) transmission based at least in part on a precoding matrix, wherein the precoding matrix is based at least in part on the analog precoding matrix indication.

30 Claims, 13 Drawing Sheets

400

Network Node

UE

402: SRS

404: Estimate channel and precode CSI-RS

406: Precoded CSI-RS

408: Estimate channel and determine precoder

410: DCI (Rank)

412: PUSCH Transmission

400

500

Partial Coherent Precoder:

| Precoding submatrix for first antenna group | All zeros |
|---|---|
| All zeros | Precoding submatrix for second antenna group |

1010   Receive, from a network node, an analog precoding matrix indication

1020   Transmit, to the network node, a physical uplink shared channel (PUSCH) transmission based at least in part on a precoding matrix, wherein the precoding matrix is based at least in part on the analog precoding matrix indication 1110     Transmit, to a user equipment (UE), an analog precoding matrix indication 1120     Receive, from the UE, a physical uplink shared channel (PUSCH) transmission based at least in part on a precoding matrix, wherein the precoding matrix is based at least in part on the analog precoding matrix indication

1100

TRANSMITTING AN UPLINK TRANSMISSION USING A PRECODING MATRIX DERIVED FROM AN ANALOG PRECODING MATRIX INDICATION

FIELD OF THE DISCLOSURE

Aspects of the present disclosure generally relate to wireless communication and to techniques and apparatuses for transmitting an uplink transmission using a precoding matrix derived from an analog precoding matrix indication.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to an apparatus for wireless communication at a user equipment (UE). The apparatus may include a memory and one or more processors coupled to the memory. The one or more processors may be configured to receive, from a network node, an analog precoding matrix indication. The one or more processors may be configured to transmit, to the network node, a physical uplink shared channel (PUSCH) transmission based at least in part on a precoding matrix, wherein the precoding matrix is based at least in part on the analog precoding matrix indication.

Some aspects described herein relate to an apparatus for wireless communication at a network node. The apparatus may include a memory and one or more processors coupled to the memory. The one or more processors may be configured to transmit, to a UE, an analog precoding matrix indication. The one or more processors may be configured to receive, from the UE, a PUSCH transmission based at least in part on a precoding matrix, wherein the precoding matrix is based at least in part on the analog precoding matrix indication.

Some aspects described herein relate to a method of wireless communication performed by a UE. The method may include receiving, from a network node, an analog precoding matrix indication. The method may include transmitting, to the network node, a PUSCH transmission based at least in part on a precoding matrix, wherein the precoding matrix is based at least in part on the analog precoding matrix indication.

Some aspects described herein relate to a method of wireless communication performed by a network node. The method may include transmitting, to a UE, an analog precoding matrix indication. The method may include receiving, from the UE, a PUSCH transmission based at least in part on a precoding matrix, wherein the precoding matrix is based at least in part on the analog precoding matrix indication.

Some aspects described herein relate to a non-transitory computer-readable medium that stores a set of instructions for wireless communication by a UE. The set of instructions, when executed by one or more processors of the UE, may cause the UE to receive, from a network node, an analog precoding matrix indication. The set of instructions, when executed by one or more processors of the UE, may cause the UE to transmit, to the network node, a PUSCH transmission based at least in part on a precoding matrix, wherein the precoding matrix is based at least in part on the analog precoding matrix indication.

Some aspects described herein relate to a non-transitory computer-readable medium that stores a set of instructions for wireless communication by a network node. The set of instructions, when executed by one or more processors of the network node, may cause the network node to transmit, to a UE, an analog precoding matrix indication. The set of instructions, when executed by one or more processors of the network node, may cause the network node to receive, from the UE, a PUSCH transmission based at least in part on a precoding matrix, wherein the precoding matrix is based at least in part on the analog precoding matrix indication.

Some aspects described herein relate to an apparatus for wireless communication. The apparatus may include means for receiving, from a network node, an analog precoding matrix indication. The apparatus may include means for transmitting, to the network node, a PUSCH transmission based at least in part on a precoding matrix, wherein the precoding matrix is based at least in part on the analog precoding matrix indication.

Some aspects described herein relate to an apparatus for wireless communication. The apparatus may include means for transmitting, to a UE, a precoded CSI-RS. The apparatus may include means for receiving, from the UE, a PUSCH transmission based at least in part on a precoding matrix, wherein the precoding matrix is based at least in part on the precoded CSI-RS.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 4-9 are diagrams illustrating examples associated with transmitting an uplink transmission using a precoding matrix derived from an analog precoding matrix indication, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
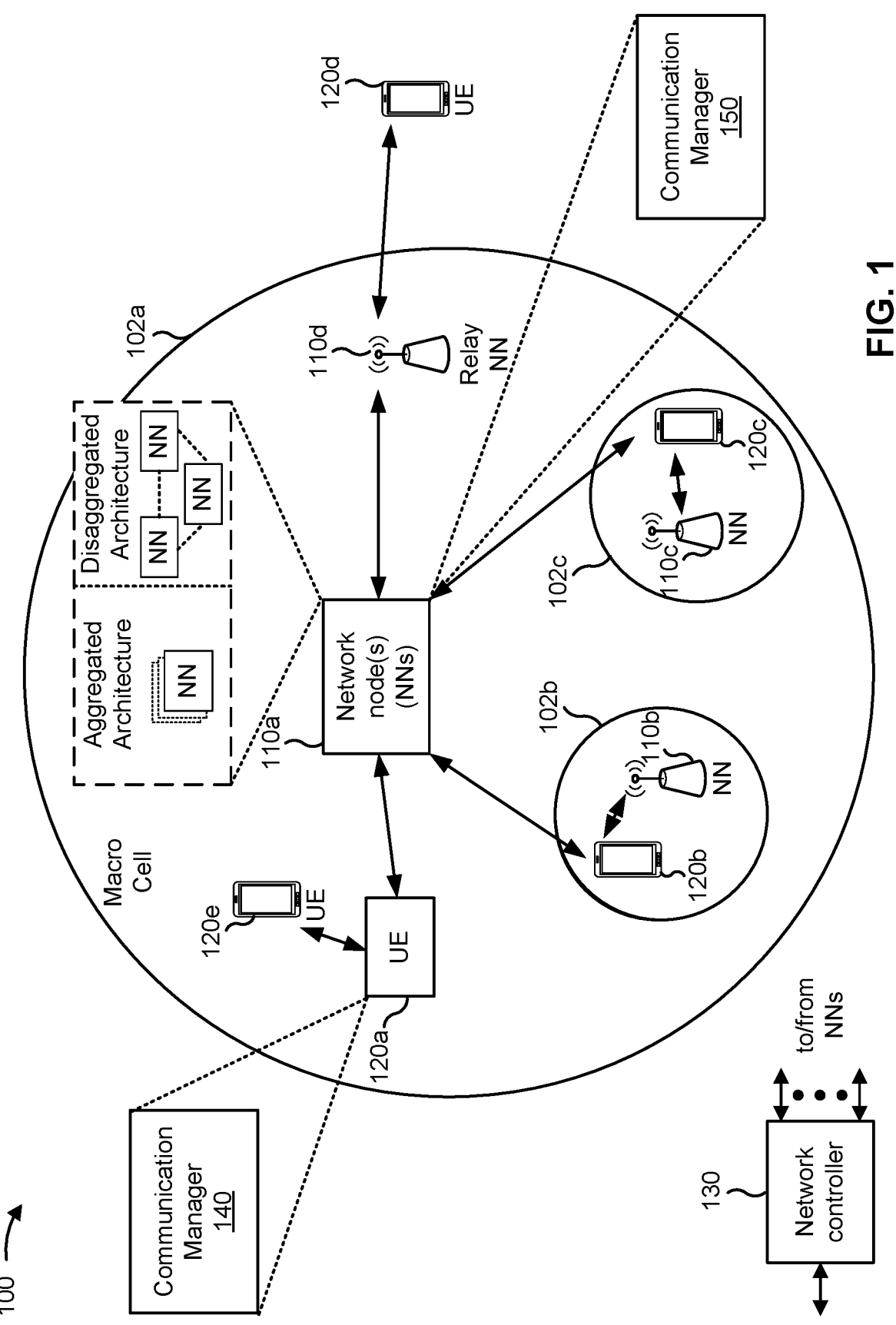
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node <br>

5

110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, cache of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120c) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHZ) and FR2 (24.25 GHZ-52.6 GHZ). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHZ) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHZ. For example, three higher operating bands have been identified as frequency range designations FR4a or FR4-1 (52.6 GHZ-71 GHz), FR4 (52.6 GHZ-114.25 GHZ), and FR5 (114.25 GHZ-300 GHZ). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a UE (e.g., UE 120) may include a communication manager 140. As described in more detail elsewhere herein, the communication manager 140 may receive, from a network node, an analog precoding matrix indication; and transmit, to the network node, a physical uplink shared channel (PUSCH) transmission based at least in part on a precoding matrix, wherein the precoding matrix is based at least in part on the analog precoding matrix indication. Additionally, or alternatively, the communication manager 140 may perform one or more other operations described herein.

In some aspects, a network node (e.g., network node 110) may include a communication manager 150. As described in more detail elsewhere herein, the communication manager 150 may transmit, to a UE, an analog precoding matrix indication; and receive, from the UE, a PUSCH transmission based at least in part on a precoding matrix, wherein the precoding matrix is based at least in part on the analog precoding matrix indication. Additionally, or alternatively, the communication manager 150 may perform one or more other operations described herein.

As indicated above, FIG. 1 is provided as an example. Other examples may differ from what is described with regard to FIG. 1.

Figure 2:
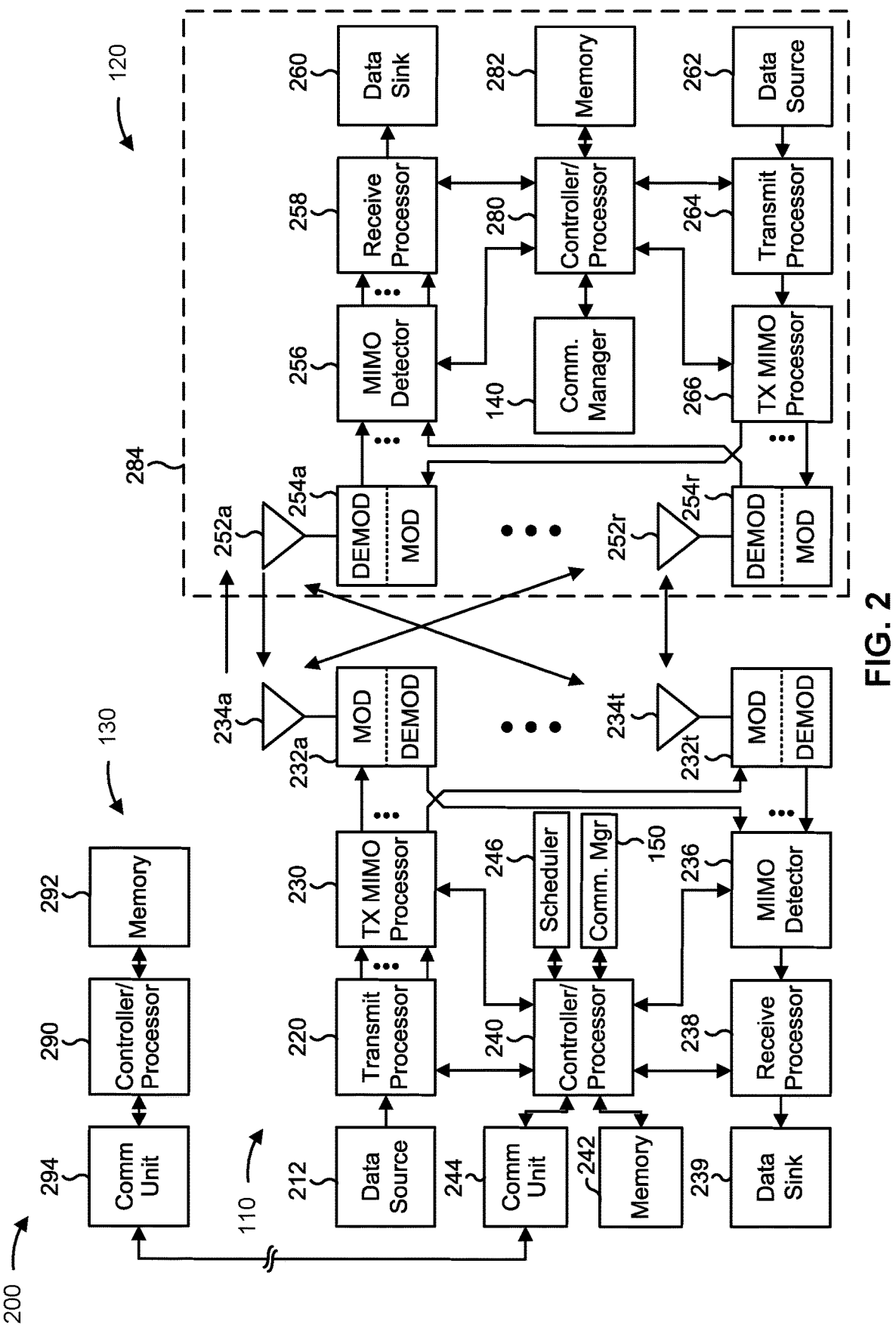
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-13).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-13).

The controller/processor 240 of the network node 110, the controller/processor 280 of the UE 120, and/or any other component(s) of FIG. 2 may perform one or more techniques associated with transmitting an uplink transmission using a precoding matrix derived from an analog precoding matrix indication, as described in more detail elsewhere herein. For example, the controller/processor 240 of the network node 110, the controller/processor 280 of the UE 120, and/or any other component(s) of FIG. 2 may perform or direct operations of, for example, process 1000 of FIG. 10, process 1100 of FIG. 11, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 1000 of FIG. 10, process 1100 of FIG. 11, and/or other processes as described herein. In some examples, executing instructions may include running the instructions, converting the instructions, compiling the instructions, and/or interpreting the instructions, among other examples.

In some aspects, a UE (e.g., UE 120) includes means for receiving, from a network node, an analog precoding matrix indication (e.g., using antenna 252, modem 254, MIMO detector 256, receive processor 258, controller/processor 280, memory 282, or the like); and/or means for transmitting, to the network node, a PUSCH transmission based at least in part on a precoding matrix, wherein the precoding matrix is based at least in part on the analog precoding matrix indication (e.g., using controller/processor 280, transmit processor 264, TX MIMO processor 266, modem 254, antenna 252, memory 282, or the like). The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (e.g., network node 110) includes means for transmitting, to a UE, an analog precoding matrix indication (e.g., using controller/processor 240, transmit processor 220, TX MIMO processor 230, modem 232, antenna 234, memory 242, or the like); and/or means for receiving, from the UE, a PUSCH transmission based at least in part on a precoding matrix, wherein the precoding matrix is based at least in part on the analog precoding matrix indication (e.g., using antenna 234, modem 232, MIMO detector 236, receive processor 238, controller/ processor 240, memory 242, or the like). The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (CNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
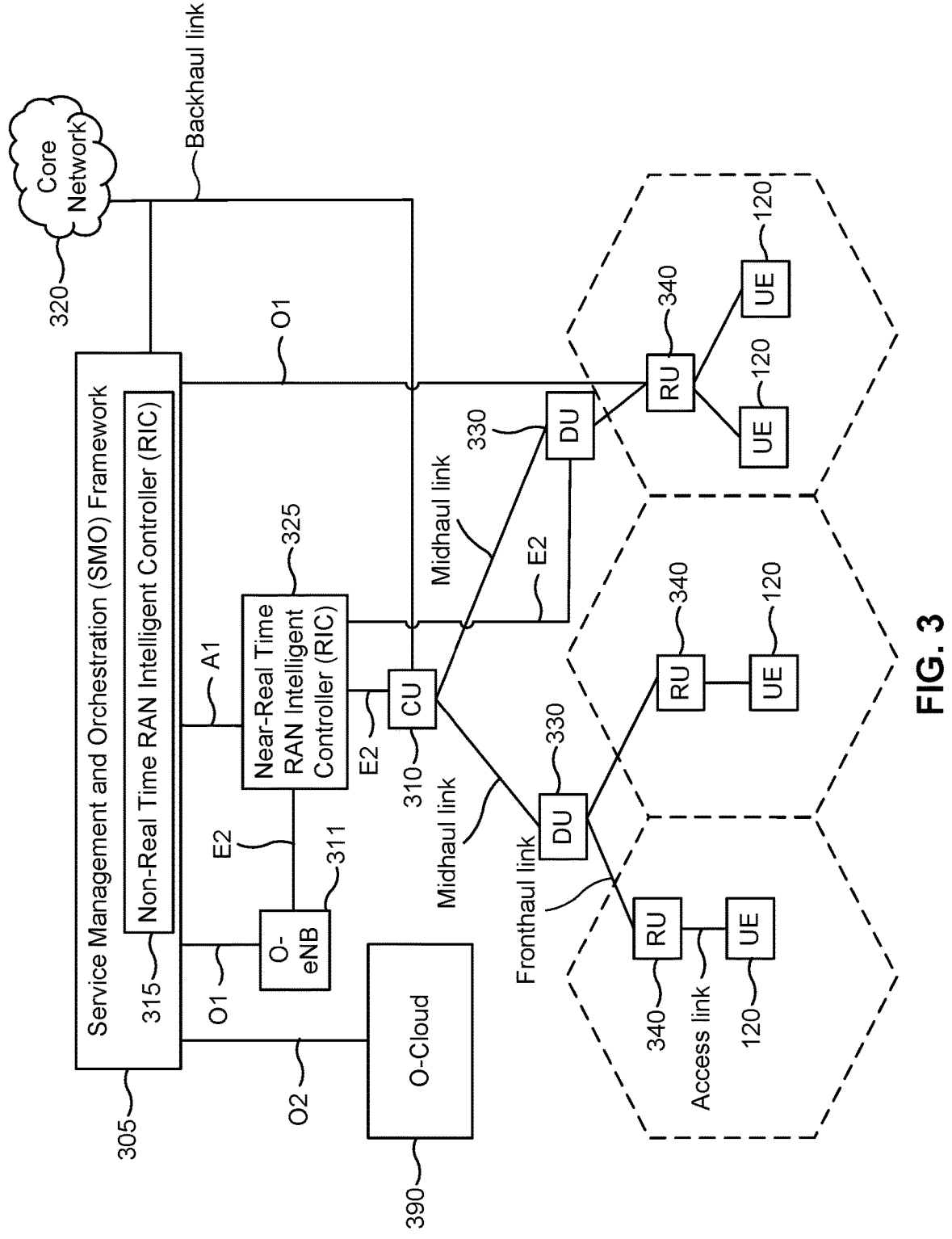
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (IFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

A network node may transmit, to a UE, a scheduling downlink control information (DCI) to jointly indicate a precoder and a rank (e.g., a number of layers) for a PUSCH MIMO transmission. The scheduling DCI may include a "precoding information and number of layers" field to jointly indicate the precoder and the rank. The precoder may be associated with a transmit precoding matrix indicator (TPMI), which may be an index of the precoder that the UE should select from a predefined codebook. The rank may be associated with the number of layers for the PUSCH MIMO transmission. The scheduling DCI may include a number of bits to jointly indicate the precoder and the rank (e.g., up to six bits to indicate up to 64 possible combinations of precoder and rank). For example, a bit field mapped to index "0" may be associated with one layer and TPMI=0, a bit field mapped to index "1" may be associated with one layer and TPMI=1, and so on.

The network node may transmit the scheduling DCI to jointly indicate the precoder and the rank using a digital signaling scheme (e.g., a pure digital signaling scheme). When using the digital signaling scheme, the number of precoder and rank combinations that may be signaled by the network node to the UE may be limited by the number of bits of the "precoding information and number of layers" field in the scheduling DCI. A larger number of bits may be associated with more possible precoder and rank combinations, but may result in an increased signaling overhead.

In various aspects of techniques and apparatuses described herein, a UE may receive, from a network node, an analog precoding matrix indication. In some aspects, the analog precoding matrix indication may be an analog reference signal. In some aspects, the analog reference signal may be a precoded CSI-RS. The UE may determine a precoding matrix based at least in part on the analog precoding matrix indication. In some aspects, the UE may determine the precoding matrix based at least in part on the precoded CSI-RS.

In some aspects, the analog precoding matrix indication may mean that the precoding matrix is not explicitly indicated via an indicator field in DCI (which is the conventional digital precoding indication). Since the precoding matrix is not explicitly indicated via the indicator field in DCI, the lack of an indicator for the precoding matrix in DCI may be an indication (e.g., an implicit indication) that the precoding matrix will be signaled or indicated using an analog signal, where the analog signal may be an analog reference signal such as a CSI-RS. The UE may then perform a singular value decomposition (SVD) to decompose an estimated CSI-RS channel to obtain the precoding matrix, as described in greater detail below. As used herein, the precoding matrix being signaled or indicated using an analog signal is intended to mean that the analog signal (e.g., an analog reference signal, such as a precoded CSI-RS) enables the UE to determine the precoding matrix without explicit digital signaling of the precoding matrix via, e.g., DCI.

In some aspects, the UE may receive, from the network node, a DCI that includes one or more bits to digitally indicate a rank. The rank may be associated with a digital signaling from the network node. Alternatively, the precoded CSI-RS may be associated with a subset of CSI-RS ports from a plurality of possible CSI-RS ports. The UE may determine the rank based at least in part on the subset of CSI-RS ports. In this case, the rank may be associated with analog signaling from the network node, e.g., the analog precoding matrix indication. In some aspects, the UE may determine both the precoding matrix and the rank based at least in part on the analog precoding matrix indication, or the UE may determine the precoding matrix based at least in part on the analog precoding matrix indication and the rank based at least in part on the digital signaling, where a downlink channel between the UE and the network node may be reciprocal to an uplink channel between the UE and the network node.

In some aspects, the UE may transmit, to the network node, a PUSCH transmission based at least in part on the precoding matrix and the rank. In some aspects, by indicating the precoding matrix and/or the rank via the precoded CSI-RS, the network node may reduce a number of bits in the DCI, thereby improving a system performance. Further, by indicating the precoding matrix in an analog manner via the precoded CSI-RS, the network node may be able to indicate virtually any precoding matrix without the network node being forced to quantize to a certain predefined precoding matrix, thereby enabling the UE to apply a more accurate precoding matrix, which may improve the system performance.

Figure 4:

FIG. 4 is a diagram illustrating an example 400 associated with transmitting an uplink transmission using a precoding matrix derived from an analog precoding matrix indication, in accordance with the present disclosure. As shown in FIG. 4, example 400 includes communication between a UE (e.g., UE 120) and a network node (e.g., network node 110). In some aspects, the UE and the network node may be included in a wireless network, such as wireless network 100.

In some aspects, the network node may indicate, to the UE, a rank using digital signaling and a precoder using analog signaling (e.g., an analog precoding matrix indication). The network node may use a hybrid signaling approach, which may involve using both digital signaling and analog signaling. The network node may use the analog signaling to indicate the precoder, which may be a fully coherent precoder, a partial coherent precoder, or a non-coherent precoder. The network node may use a CSI-RS to deliver precoder information in an analog manner. The network node may use a number of bits (e.g., three bits) in a scheduling DCI to indicate rank information in a digital manner. The rank information may indicate a number of layers for a PUSCH MIMO transmission. With the hybrid signaling approach, the precoder information may be delivered in the analog manner (e.g., any precoder without quantization), and may not be limited by a number of bits in the scheduling DCI. The hybrid signaling approach may be applicable when an uplink channel and a downlink channel are reciprocal. The hybrid signaling approach may be applied to time division duplexing (TDD), but may not be suitable to frequency division duplexing (FDD).

As shown by reference number 402, the UE may transmit, to the network node, a sounding reference signal (SRS). The UE may transmit the SRS on 8 ports. The UE may transmit the SRS via an uplink channel. The SRS may be an unprecoded SRS.

As shown by reference number 404, the network node may estimate a channel H based at least in part on the SRS received from the UE. The network node may perform an SVD to decompose the estimated channel to obtain $H=UDV^H$, where U may indicate a precoding matrix to be applied by the UE, D may indicate a diagonal matrix corresponding to an energy of each layer, and $V^H$ may indicate a precoding matrix to be applied by the network node. It is noted that the term $V^H$ refers to the Hermitian of V, otherwise referred to as the transpose of the complex conjugate of V. It is understood that V is also the Hermitian of $V^H$. The channel H may be represented by the U matrix, the D matrix, and the $V^H$ matrix. The network node may precode a CSI-RS with a precoding matrix, where the precoding matrix may be represented by $VD^{-1}$ (e.g., matrix V multiplied by the inverse of matrix D).

As shown by reference number 406, the network node may transmit, to the UE, the precoded CSI-RS. The precoded CSI-RS may be based at least in part on the unprecoded SRS. The CSI-RS may be precoded with the precoding matrix $VD^{-1}$. The network node may transmit the precoded CSI-RS via a downlink channel.

As shown by reference number 408, the UE may estimate the channel based at least in part on the precoded CSI-RS. The channel seen by the UE may be represented by $HVD^{-1}$, which may correspond to the channel H multiplied by the precoding matrix $(VD^{-1})$ applied to the CSI-RS. As noted above with reference to 404, H may be decomposed using SVD. Hence, the UE may perform an SVD to decompose the estimated channel to obtain $H=UDV^H$ and thus, $HVD^{-1}$ may be equal to $UDV^H VD^{-1}$, which may be equal to U. The channel estimated by the UE may effectively be the matrix U, which may be an 8 by 8 unitary matrix. After the UE estimates the channel based at least in part on the precoded CSI-RS, the UE may obtain the matrix U, which may correspond to the precoding matrix to be applied by the UE. As a result, the UE may determine the precoding matrix, which may be used by the UE for a PUSCH transmission. The precoding matrix may be delivered to the UE without explicitly transmitting any bits. The precoding matrix may be delivered to the UE in an analog manner without quantization. The precoding matrix may be implicitly indicated via the precoded CSI-RS.

As shown by reference number 410, the network node may transmit, to the UE, the scheduling DCI. The scheduling DCI may schedule a PUSCH transmission for the UE. The scheduling DCI may include a number of bits (e.g., three bits) to indicate the rank. The rank may be delivered to the UE by explicitly transmitting the number of bits in the scheduling DCI.

As shown by reference number 412, the UE may transmit, to the network node, the PUSCH transmission (e.g., a PUSCH MIMO transmission). When the scheduling DCI indicates a rank=X, the UE may transmit the PUSCH transmission using the first X rows in the matrix U, assuming that the SVD performed by the network node is ordered SVD which generates descending diagonal entries in the matrix D.

As indicated above, FIG. 4 is provided as an example. Other examples may differ from what is described with regard to FIG. 4.

FIG. 5 is a diagram illustrating an example 500 associated with transmitting an uplink transmission using a precoding matrix derived from an analog precoding matrix indication, in accordance with the present disclosure.

As shown in FIG. 5, a partial coherent precoder may be signaled. The partial coherent precoder may be composed of a precoding submatrix for a first antenna group, a first group of zeros (e.g., all zeros), a precoding matrix for a second antenna group, and a second group of zeros (e.g., all zeros). Antennas within the first antenna group may be coherent. Antennas within the second group may be coherent. Antennas across the first and second antenna groups may be non-coherent.

As indicated above, FIG. 5 is provided as an example. Other examples may differ from what is described with regard to FIG. 5.

Figure 6:
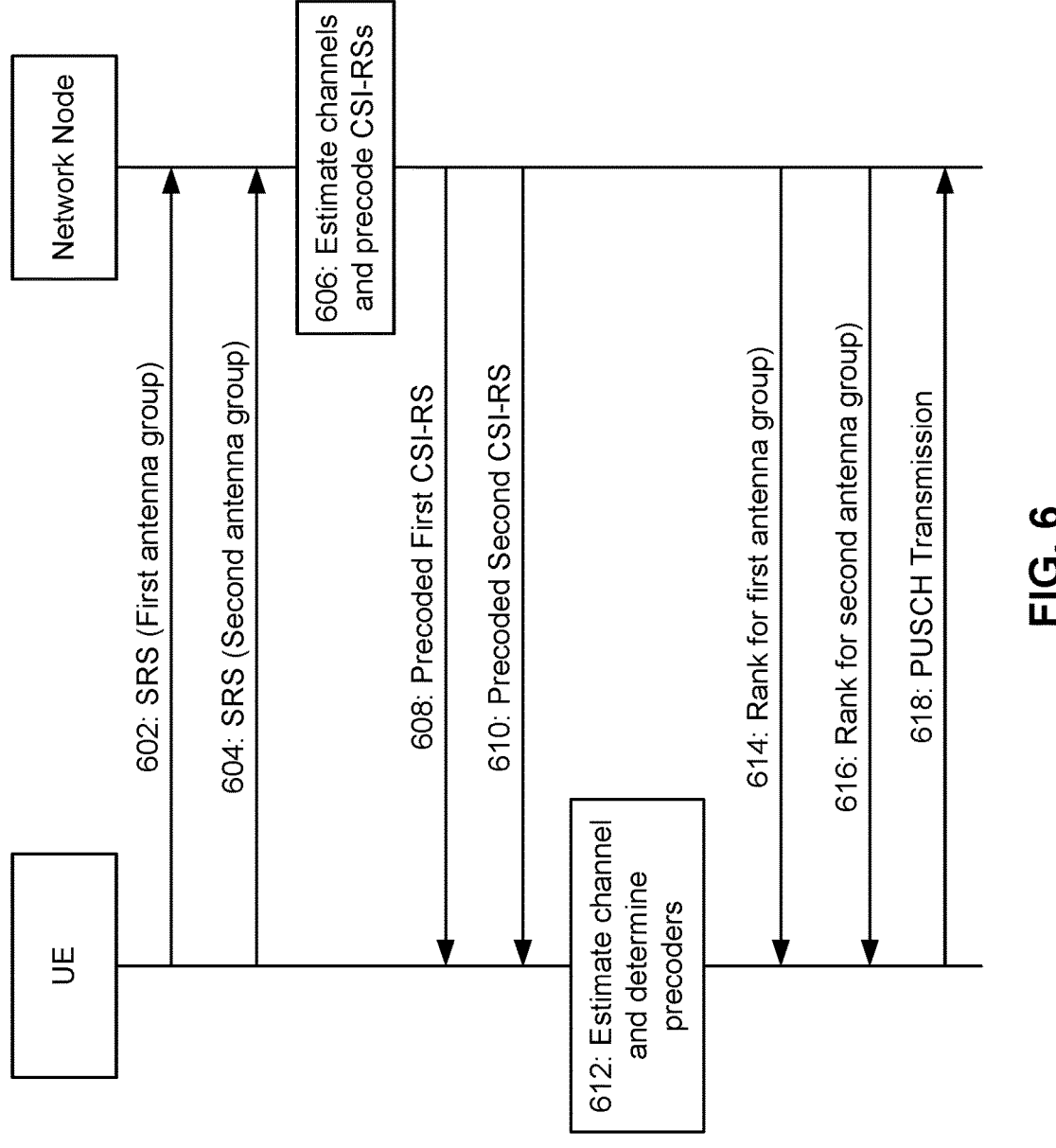

FIG. 6 is a diagram illustrating an example 600 associated with transmitting an uplink transmission using a precoding matrix derived from an analog precoding matrix indication, in accordance with the present disclosure. As shown in FIG. 6, example 600 includes communication between a UE (e.g., UE 120) and a network node (e.g., network node 110). In some aspects, the UE and the network node may be included in a wireless network, such as wireless network 100.

In some aspects, in order to handle partial coherent precoder signaling, the network node may transmit two separate signalings for two antennas groups of the UE, where each of the two separate signalings may include a digital signaling for a rank and an analog signaling (e.g., an analog precoding matrix indication) for a precoder for a corresponding antenna group. The two antenna groups of the UE may include a first antenna group and a second antenna group. A first CSI-RS (CSI-RS A) may be for the first antenna group. A first rank indicator field (field A) in a scheduling DCI may indicate a rank for the first antenna group. A second CSI-RS (CSI-RS B) may be for the second antenna group. A second rank indicator field (field B) in the scheduling DCI may indicate a rank for the second antenna group. In some aspects, SRS sounding for the two antenna groups may be performed in separate resources, such as in two OFDM symbols, and precoded CSI-RS transmission for the two antenna groups may be performed in separate resources, such as in two OFDM symbols.

As shown by reference number 602, the UE may transmit, to the network node, a first set of SRSs. The UE may transmit the first set of SRSs on four ports for the first antenna group. The UE may transmit the first set of SRSs via an uplink channel. The first set of SRSs may be unprecoded SRSs.

As shown by reference number 604, the UE may transmit, to the network node, a second set of SRSs. The UE may transmit the second set of SRSs on four ports for the second antenna group. The UE may transmit the second set of SRSs via the uplink channel. The second set of SRSs may be unprecoded SRSs.

As shown by reference number 606, the network node may estimate a channel H1 based at least in part on the first set of SRSs received from the UE. The network node may perform an SVD to obtain $$H_1 = U_1 D_1 V_1^H,$$

where $U_1$ may indicate a first precoding matrix to be applied by the UE for the first antenna group, $D_1$ may indicate a first diagonal matrix associated with the first antenna group, and $$V_1^H$$

may indicate a first precoding matrix to be applied by the network node for the first antenna group. The network node may precode the first CSI-RS (CSI-RS A) with a first precoding matrix represented by $V_1D_1^{-1}$. The UE may estimate a channel H2 based at least in part on the second set of SRSs received from the UE. The network node may perform an SVD to obtain $$H_2 = U_2D_2V_2^H,$$

where $U_2$ may indicate a second precoding matrix to be applied by the UE for the second antenna group, $D_2$ may indicate a second diagonal matrix associated with the second antenna group, and $$V_2^H$$

may indicate a second precoding matrix to be applied by the network node for the second antenna group. The network node may precode the second CSI-RS (CSI-RS B) with a second precoding matrix represented by $V_2D_2^{-1}$.

As shown by reference number 608, the network node may transmit, to the UE, the precoded first CSI-RS (CSI-RS A). The first CSI-RS may be precoded with the first precoding matrix $V_1D_1^{-1}$. The network node may transmit the precoded first CSI-RS via a downlink channel. The precoded first CSI-RS may be associated with the first antenna group.

As shown by reference number 610, the network node may transmit, to the UE, the precoded second CSI-RS (CSI-RS B). The second CSI-RS may be precoded with the second precoding matrix $V_2D_2^{-1}$. The network node may transmit the precoded second CSI-RS via the downlink channel. The precoded second CSI-RS may be associated with the second antenna group.

As shown by reference number 612, the UE may estimate the channel H1 and the channel H2 based at least in part on the precoded first CSI-RS and the precoded second CSI-RS, respectively. The channel H1 and the channel H2 estimated by the UE may effectively be the matrix $U_1$ and the matrix $U_2$, respectively, which may be 4 by 4 unitary matrices. The matrix $U_1$ and the matrix $U_2$ may correspond to the first precoding matrix to be applied by the UE for the first antenna group and the second precoding matrix to be applied by the UE for the second antenna group, respectively. As a result, the UE may determine the first precoding matrix and the second precoding matrix, which may be used by the UE for a PUSCH transmission.

As shown by reference number 614, the network node may transmit, to the UE, a number of bits (e.g., two bits) in DCI to indicate a first rank for the first antenna group. As shown by reference number 616, the network node may transmit, to the UE, a number of bits (e.g., two bits) in the DCI to indicate a second rank for the second antenna group.

The number of bits to indicate the first rank and the number of bits to indicate the second rank may be indicated in the same DCI.

In some aspects, ranks for the first antenna group and the second antenna group may be indicated in a first rank indicator field (field A) and a second rank indicator field (field B) in the DCI. In other words, a scheduling DCI may include two rank indicator fields, one for indicating the first rank for the first antenna group, and the other for indicating the second rank for the second antenna group. Thus, the first rank and the second rank may be indicated in first and second fields included in the same DCI transmission (e.g., in the scheduling DCI that schedules the PUSCH transmission).

As shown by reference number 618, the UE may transmit, to the network node, the PUSCH transmission (e.g., a PUSCH MIMO transmission). When the first rank=X and the second rank=Y, the UE may transmit the PUSCH transmission using the first antenna group precoded with the first X rows in the matrix $U_1$, and using the second antenna group precoded with the first Y rows in the matrix $U_2$.

As indicated above, FIG. 6 is provided as an example. Other examples may differ from what is described with regard to FIG. 6.

Figure 7:
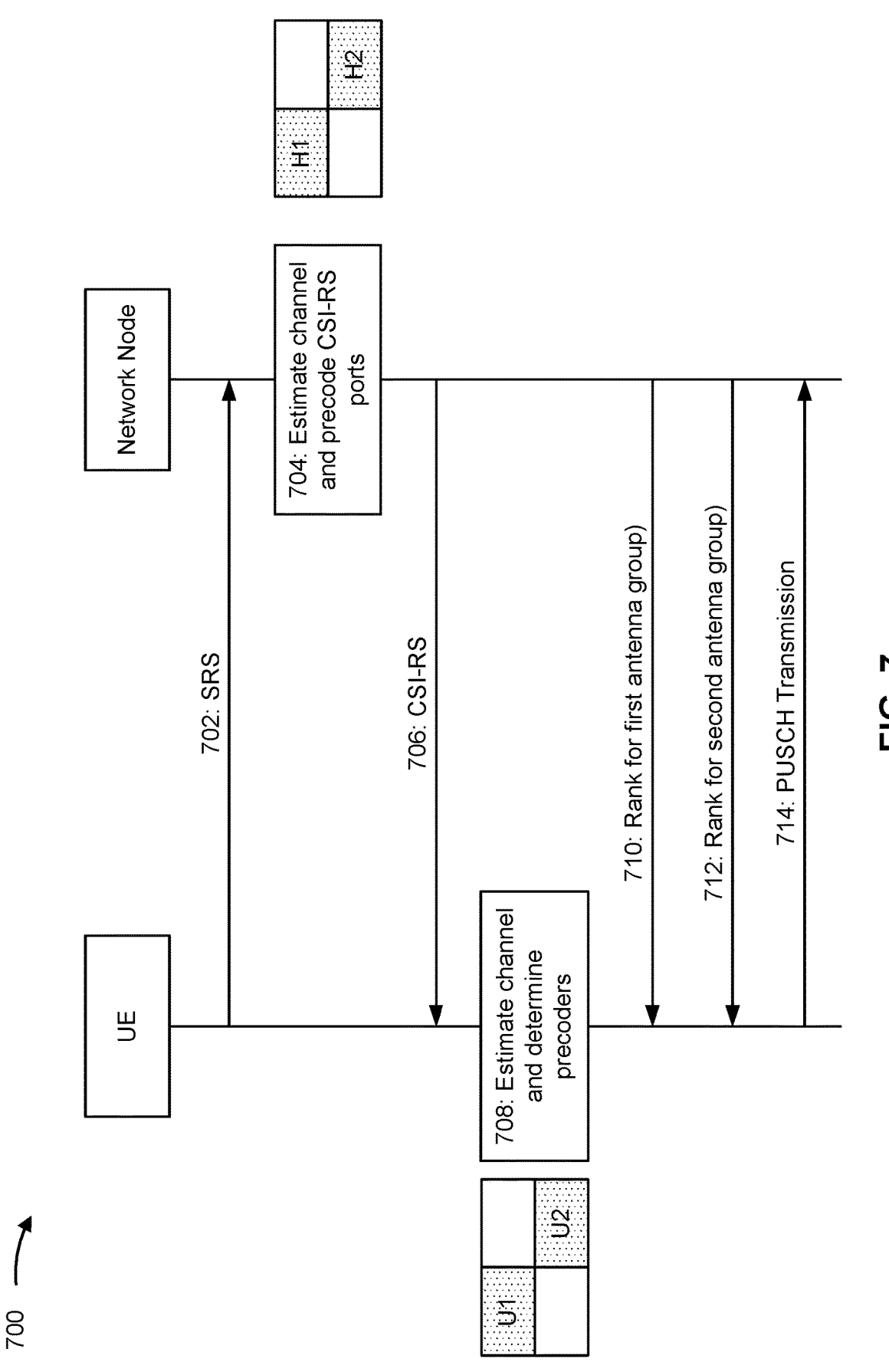

FIG. 7 is a diagram illustrating an example 700 associated with transmitting an uplink transmission using a precoding matrix derived from an analog precoding matrix indication, in accordance with the present disclosure. As shown in FIG. 7, example 700 includes communication between a UE (e.g., UE 120) and a network node (e.g., network node 110). In some aspects, the UE and the network node may be included in a wireless network, such as wireless network 100.

In some aspects, in order to handle partial coherent precoder signaling, an SRS may be associated with one resource (e.g., one OFDM symbol) and a CSI-RS may be associated with one resource (e.g., one OFDM symbol), even when the UE is associated with a first antenna group and a second antenna group.

As shown by reference number 702, the UE may transmit, to the network node, an SRS. The UE may transmit the SRS on 8 ports. The UE may transmit the SRS via an uplink channel. The SRS may be an unprecoded SRS.

As shown by reference number 704, the network node may estimate a channel H based at least in part on the SRS received from the UE. The network node may extract, from the channel H, a channel H1 and a channel H2, where the channel H1 may be associated with the first antenna group and a channel H2 may be associated with the second channel group. The network node may perform an SVD to obtain $$H_1 = U_1D_1V_1^H.$$

The network node may perform an SVD to obtain $$H_2 = U_2D_2V_2^H.$$

The network node may precode four CSI-RS ports with a first precoding matrix represented by $V_1D_1^{-1}$. The network node may precode four CSI-RS ports with a second precoding matrix represented by $V_2D_2^{-1}$.

As shown by reference number 706, the network node may transmit, to the UE, a precoded CSI-RS, where the four CSI-RS ports may be precoded with the first precoding matrix represented by $V_1D_1^{-1}$ and the four CSI-RS ports may be precoded with the second precoding matrix represented by $V_2D_2^{-1}$. The network node may transmit the precoded CSI-RS via a downlink channel.

As shown by reference number 708, the UE may estimate the channel H1 and the channel H2 based at least in part on the precoded CSI-RS. The channel H1 and the channel H2 estimated by the UE may effectively be the matrix $U_1$ and the matrix $U_2$, respectively, which may be 4 by 4 unitary matrices. The matrix $U_1$ and the matrix $U_2$ may correspond to the first precoding matrix to be applied by the UE for the first antenna group and the second precoding matrix to be applied by the UE for the second antenna group, respectively. As a result, the UE may determine the first precoding matrix and the second precoding matrix, which may be used by the UE for a PUSCH transmission.

As shown by reference number 710, the network node may transmit, to the UE, a number of bits (e.g., two bits) in DCI to indicate a first rank for the first antenna group. As shown by reference number 712, the network node may transmit, to the UE, a number of bits (e.g., two bits) in the DCI to indicate a second rank for the second antenna group. The number of bits to indicate the first rank and the number of bits to indicate the second rank may be indicated in the same DCI.

As shown by reference number 714, the UE may transmit, to the network node, the PUSCH transmission (e.g., a PUSCH MIMO transmission). When the first rank=X and the second rank=Y, the UE may transmit the PUSCH transmission using the first antenna group precoded with the first X rows in the matrix $U_1$, and using the second antenna group precoded with the first Y rows in the matrix $U_2$.

As indicated above, FIG. 7 is provided as an example. Other examples may differ from what is described with regard to FIG. 7.

Figure 8:
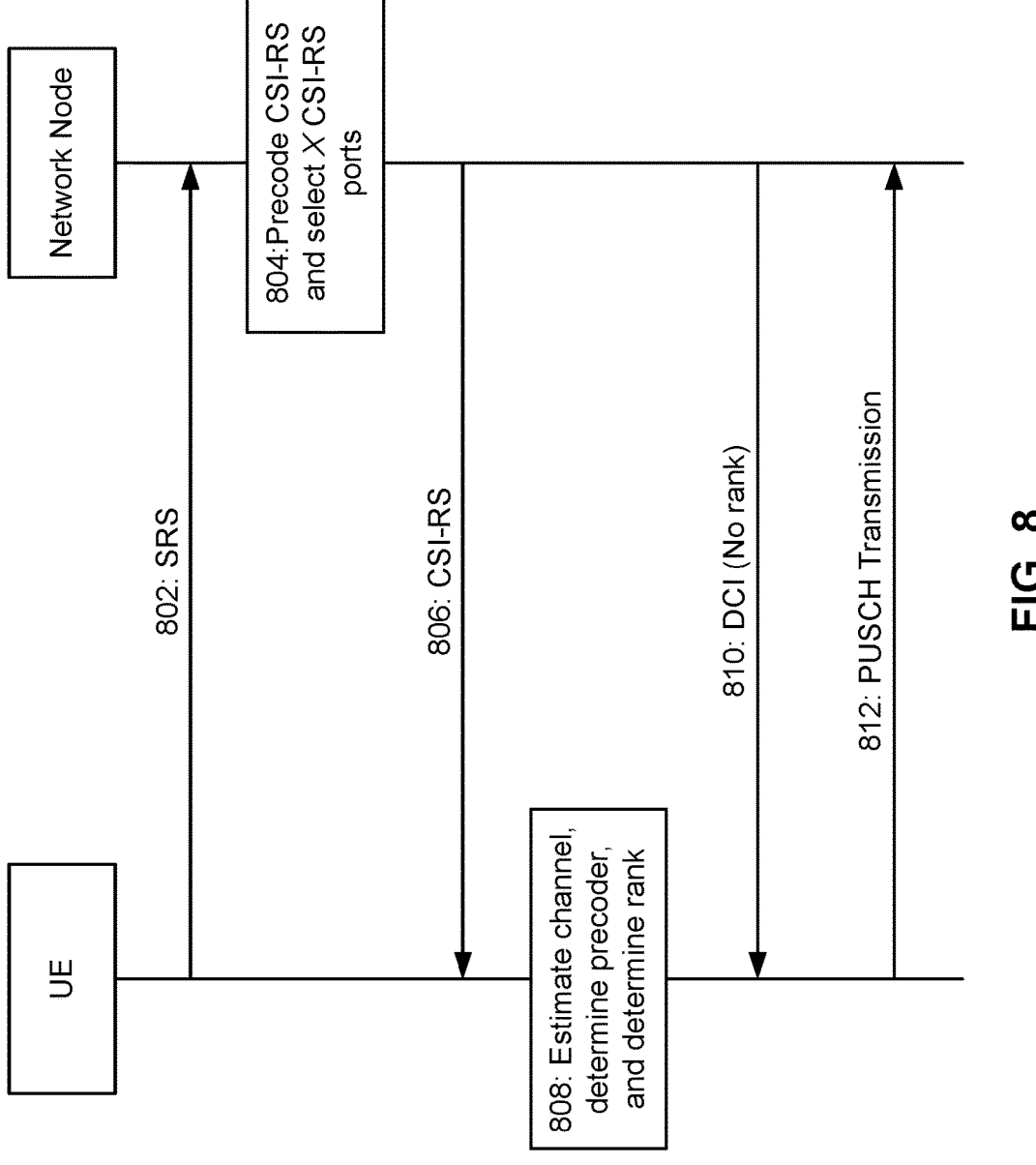

FIG. 8 is a diagram illustrating an example 800 associated with transmitting an uplink transmission using a precoding matrix derived from an analog precoding matrix indication, in accordance with the present disclosure. As shown in FIG. 8, example 800 includes communication between a UE (e.g., UE 120) and a network node (e.g., network node 110). In some aspects, the UE and the network node may be included in a wireless network, such as wireless network 100.

In some aspects, the network node may indicate, to the UE, both a rank and a precoder in an analog manner (as opposed to a digital manner). The network node may transmit a subset of CSI-RS ports. The UE, after a channel estimation, may determine the number of CSI-RS ports used by the network node. The number of CSI-RS ports may be used as the rank by the UE. In other words, the number of CSI-RS ports may be used to indicate the rank (e.g., a PUSCH rank) in a dynamic manner to the UE.

As shown by reference number 802, the UE may transmit, to the network node, an SRS. The UE may transmit the SRS on 8 ports. The UE may transmit the SRS via an uplink channel. The SRS may be an unprecoded SRS.

As shown by reference number 804, the network node may estimate a channel H based at least in part on the SRS received from the UE. The network node may perform an SVD to obtain $H=UDV^H$. The network node may precode a CSI-RS with a precoding matrix, where the precoding matrix may be represented by $VD^{-1}$. The network node may precode the CSI-RS with the precoding matrix represented by $VD^{-1}$ after the SVD is obtained from the SRS. A CSI-RS resource may be RRC configured with Lmax CSI-RS ports, where Lmax may indicate the maximum rank for a PUSCH transmission, and where each CSI-RS port may correspond to one potential PUSCH layer.

In some aspects, the network node may select X CSI-RS ports (e.g., a first X CSI-RS ports) to transmit the precoded CSI-RS. The network node may not transmit the precoded CSI-RS on other CSI-RS ports. The other CSI-RS ports (e.g., Lmax–X CSI-RS ports) may not be transmitted. The X CSI-RS ports may be the first X CSI-RS ports in increasing port number, which may simplify detection at the UE. Selecting the X CSI-RS ports for transmitting the precoded CSI-RS and not selecting the other CSI-RS ports may be equivalent to multiplying the precoding matrix (e.g., $VD^{-1}$) with a diagonal matrix with value one (1) on the first X diagonal entries and value 0 on other diagonal entries. For example, when Lmax=8 and X=2, the precoding matrix is $VD^{-1}T$, where T has entries $t_{i,j}$ with $t_{1,1}=t_{2,2}=1$, and $t_{i,j}=0$ for all other i=1, . . . 8 and j=1, . . . 8. In this example, only the first two CSI-RS ports may be transmitted, and remaining CSI-RS ports may not be transmitted.

As shown by reference number 808, the network node may transmit, to the UE, the precoded CSI-RS. The CSI-RS may be precoded with the precoding matrix $VD^{-1}$. The network node may transmit the precoded CSI-RS via the Lmax CSI-RS ports. The network node may transmit the precoded CSI-RS via a downlink channel.

As shown by reference number 808, the UE may estimate the channel based at least in part on the precoded CSI-RS, where the precoded CSI-RS may be associated with Lmax channel vectors. The UE may determine an effective channel for each CSI-RS port. After the UE estimates the channel based at least in part on the precoded CSI-RS, the UE may determine the precoding matrix to be applied by the UE.

In some aspects, the UE may determine (e.g., estimate) the number of CSI-RS ports used by the network node to transmit the precoded CSI-RS, which may be indicative of the value of X (e.g., the rank). The UE may determine a number of PUSCH layers as a detected number of transmitted CSI-RS ports, thereby enabling the UE to detect the value of X. The UE may determine the number of CSI-RS ports based at least in part on whether an estimated channel vector for a given CSI-RS port (e.g., a magnitude across the Rx antennas for that CSI-RS port) is sufficiently large, relative to the strongest CSI-RS port. A strongest channel vector across the CSI-RS ports (e.g., all of the CSI-RS ports) may be considered. Other CSI-RS ports having a channel vector magnitude within a threshold (e.g., in dB) of the strongest CSI-RS port may be considered. The number of such CSI-RS ports, including the strongest CSI-port, may determine the value of X. The threshold may be RRC configured by the network node. As a result, based at least in part on the precoded CSI-RS received from the network node, the UE may determine the number the number of CSI-RS ports used by the network node to transmit the precoded CSI-RS, which may be indicative of the rank.

As shown by reference number 810, the network node may transmit, to the UE, a scheduling DCI to schedule a PUSCH transmission. The scheduling DCI may not indicate the rank (e.g., the value of X), which may reduce a number of bits associated with the scheduling DCI. The scheduling DCI may exclude the rank because the UE may be able to determine the rank based at least in part on the precoded CSI-RS.

As shown by reference number 812, the UE may transmit, to the network node, the PUSCH transmission. The UE may transmit subsequent PUSCH transmissions with X layers, and by using the precoding matrix corresponding to the estimated channel across the X CSI-RS ports. In this case, neither the precoding matrix nor the rank may be indicated in the digital manner to the UE, but rather the UE may determine the precoding matrix and the rank based at least in part on the precoded CSI-RS in the analog manner, which may reduce a number of bits transmitted from the network node to the UE.

As indicated above, FIG. 8 is provided as an example. Other examples may differ from what is described with regard to FIG. 8.

In some aspects, a timeline may be defined between a precoded CSI-RS that tis transmitted by a network node and a PUSCH transmission that is transmitted by a UE, as a one-to-one relationship may not exist between the precoded CSI-RS and the PUSCH transmission. A value of X (e.g., a rank), which may be determined from a precoded CSI-RS transmission occasion, may be applied to PUSCH transmissions that occur a threshold time after the precoded CSI-RS is transmitted. The precoded CSI-RS and the PUSCH transmission may be separated by the threshold time. The threshold time may be fixed (e.g., 42 symbols), indicated as UE capability signaling, and/or RRC configured by the network node. In other words, the threshold time may be based at least in part on a predefinition, the UE capability signaling, and/or the RRC configuration from the network node. The timeline may be applicable to a precoded aperiodic CSI-RS. For a precoded periodic (or semi-persistent) CSI-RS, the timeline may consider two occasions of CSI-RS. The value of X, which may be determined from the precoded CSI-RS transmission occasion, may be applied to PUSCH transmissions that occur after the threshold time after the precoded periodic (or semi-persistent) CSI-RS and before the threshold time after a next precoded CSI-RS transmission occasion.

Figure 9:
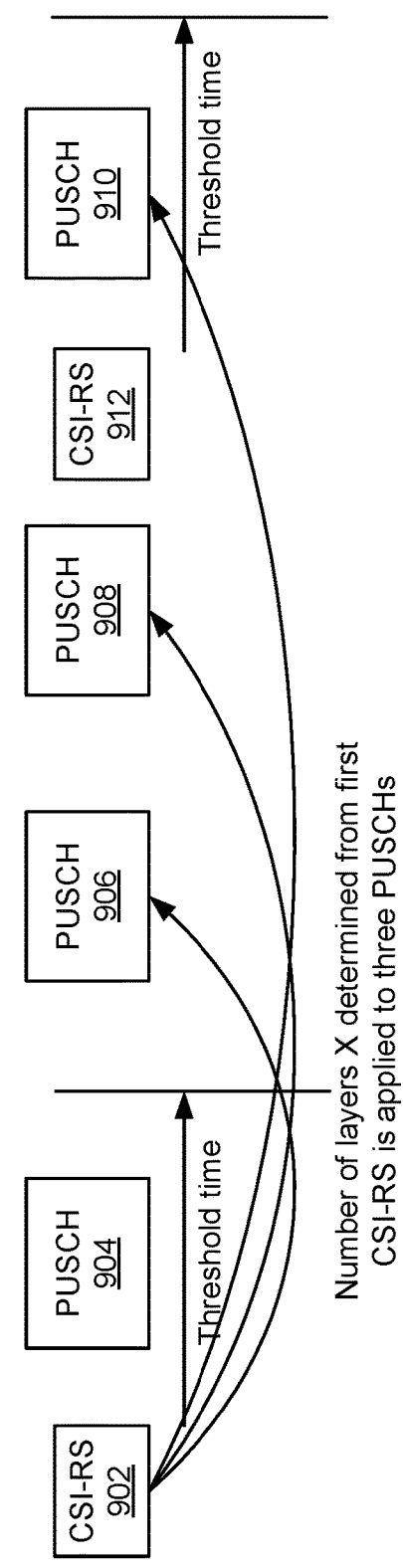

FIG. 9 is a diagram illustrating an example 900 associated with transmitting an uplink transmission using a precoding matrix derived from an analog precoding matrix indication, in accordance with the present disclosure.

As shown in FIG. 9, a network node may transmit a first precoded CSI-RS 902. A UE may determine a value of X (e.g., a rank, which may correspond to a number of layers) based at least in part on the first precoded CSI-RS 902. The UE may not apply the value of X to a PUSCH transmission 904 that occurs within a threshold time of the first precoded CSI-RS 902. Rather, the value of X determined from the first precoded CSI-RS 902 may be applied to one or more PUSCH transmissions that occur after the threshold time. For example, the UE may apply the value of X to three subsequent PUSCH transmissions 906, 908, and 910. The network node may transmit a second precoded CSI-RS 912, from which the UE may determine a revised value of X. The UE may apply the revised value of X to PUSCH transmissions that occur after the threshold time from the second precoded CSI-RS 912.

As indicated above, FIG. 9 is provided as an example. Other examples may differ from what is described with regard to FIG. 9.

Figure 10:
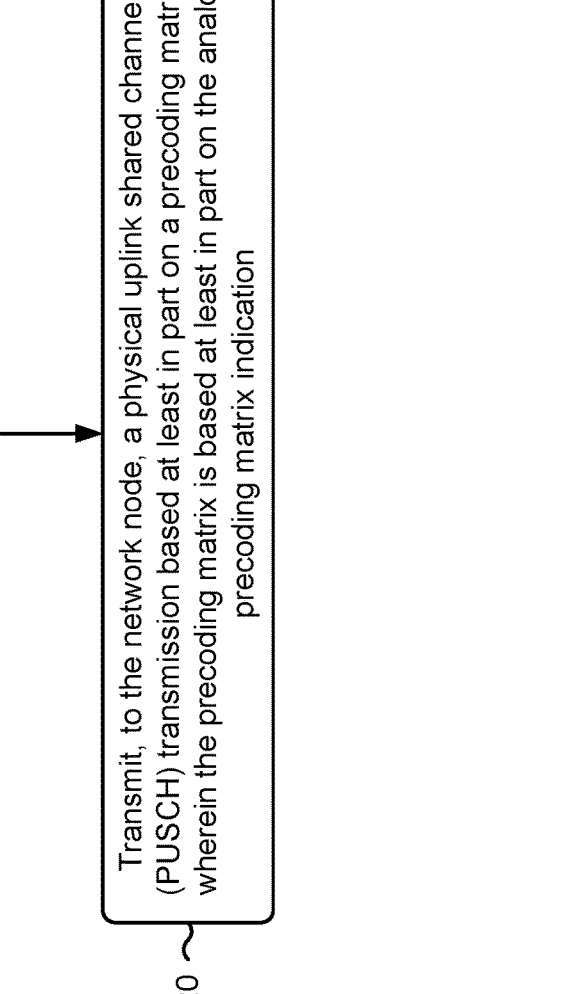
FIGS. 10-11 are diagrams illustrating example processes associated with transmitting an uplink transmission using a precoding matrix derived from an analog precoding matrix indication, in accordance with the present disclosure.

FIG. 10 is a diagram illustrating an example process 1000 performed, for example, by a UE, in accordance with the present disclosure. Example process 1000 is an example where the UE (e.g., UE 120) performs operations associated with transmitting an uplink transmission using a precoding matrix derived from an analog precoding matrix indication.

As shown in FIG. 10, in some aspects, process 1000 may include receiving, from a network node, an analog precoding matrix indication (block 1010). For example, the UE (e.g., using reception component 1202 and/or communication manager 1206, depicted in FIG. 12) may receive, from a network node, an analog precoding matrix indication, as described above, for example, with reference to FIGS. 4, 5, 6, 7, 8, and/or 9.

As further shown in FIG. 10, in some aspects, process 1000 may include transmitting, to the network node, a PUSCH transmission based at least in part on a precoding matrix, wherein the precoding matrix is based at least in part on the analog precoding matrix indication (block 1020). For example, the UE (e.g., using transmission component 1204 and/or communication manager 1206, depicted in FIG. 12) may transmit, to the network node, a PUSCH transmission based at least in part on a precoding matrix, wherein the precoding matrix is based at least in part on the analog precoding matrix indication, as described above, for example, with reference to FIGS. 4, 5, 6, 7, 8, and/or 9.

Process 1000 may include additional aspects, such as any single aspect or any combination of aspects described below and/or in connection with one or more other processes described elsewhere herein.

In a first aspect, process 1000 includes receiving, from the network node, a DCI that includes one or more bits to digitally indicate a rank, wherein the rank is associated with a digital signaling from the network node, and the PUSCH transmission is transmitted based at least in part on the rank.

In a second aspect, alone or in combination with the first aspect, process 1000 includes receiving a first DCI and a second DCI, and the first DCI is associated with a first antenna group and the second DCI is associated with a second antenna group.

In a third aspect, alone or in combination with one or more of the first and second aspects, the analog precoding matrix indication comprises an analog reference signal.

In a fourth aspect, alone or in combination with one or more of the first through third aspects, wherein the analog reference signal comprises a CSI-RS.

In a fifth aspect, alone or in combination with one or more of the first through fourth aspects, process 1000 includes receiving a first precoded CSI-RS and a second precoded CSI-RS, and the first precoded CSI-RS is associated with the first antenna group and the second precoded CSI-RS is associated with the second antenna group.

In a sixth aspect, alone or in combination with one or more of the first through fifth aspects, process 1000 includes transmitting, to the UE, an unprecoded SRS, wherein the precoded CSI-RS is based at least in part on the unprecoded SRS.

In a seventh aspect, alone or in combination with one or more of the first through sixth aspects, the precoded CSI-RS is associated with a subset of CSI-RS ports from a plurality of possible CSI-RS ports, wherein a rank is based at least in part on the subset of CSI-RS ports, and wherein the PUSCH transmission is transmitted based at least in part on the rank, wherein the one or more processors are further configured to receive, from the network node, a DCI to schedule the PUSCH transmission, the DCI excluding the rank.

In an eighth aspect, alone or in combination with one or more of the first through seventh aspects, process 1000 includes estimating a channel between the UE and the network node based at least in part on the analog precoding matrix indication received from the network node; and determining the precoding matrix to be applied by the UE based at least in part on the estimated channel between the UE and the network node.

In a ninth aspect, alone or in combination with one or more of the first through eighth aspects, the analog precoding matrix indication and the PUSCH transmission are separated by a threshold time, and wherein the threshold time is based at least in part on a predefinition, UE capability signaling, or an RRC configuration by the network node.

In a tenth aspect, alone or in combination with one or more of the first through ninth aspects, a downlink channel between the UE and the network node is reciprocal to an uplink channel between the UE and the network node.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
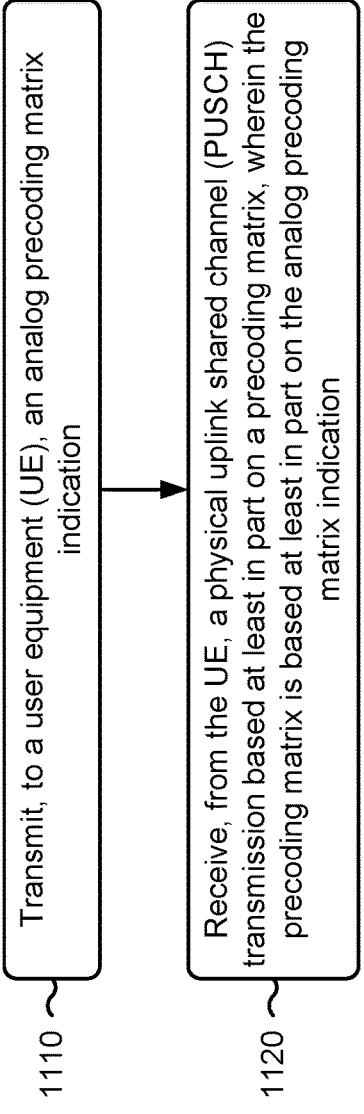

FIG. 11 is a diagram illustrating an example process 1100 performed, for example, by a network node, in accordance with the present disclosure. Example process 1100 is an example where the network node (e.g., network node 110) performs operations associated with transmitting an uplink transmission using a precoding matrix derived from an analog precoding matrix indication.

As shown in FIG. 11, in some aspects, process 1100 may include transmitting, to a UE, an analog precoding matrix indication (block 1110). For example, the network node (e.g., using transmission component 1304 and/or communication manager 1306, depicted in FIG. 13) may transmit, to a UE, an analog precoding matrix indication, as described above, for example, with reference to FIGS. 4, 5, 6, 7, 8, and/or 9.

As further shown in FIG. 11, in some aspects, process 1100 may include receiving, from the UE, a PUSCH transmission based at least in part on a precoding matrix, wherein the precoding matrix is based at least in part on the analog precoding matrix indication (block 1120). For example, the network node (e.g., using reception component 1302 and/or communication manager 1306, depicted in FIG. 13) may receive, from the UE, a PUSCH transmission based at least in part on a precoding matrix, wherein the precoding matrix is based at least in part on the analog precoding matrix indication, as described above, for example, with reference to FIGS. 4, 5, 6, 7, 8, and/or 9.

Process 1100 may include additional aspects, such as any single aspect or any combination of aspects described below and/or in connection with one or more other processes described elsewhere herein.

In a first aspect, process 1100 includes receiving, from the network node, a DCI that includes one or more bits to digitally indicate a rank, wherein the rank is associated with a digital signaling to the UE, and the PUSCH transmission is transmitted based at least in part on the rank.

In a second aspect, alone or in combination with the first aspect, the analog precoding matrix indication comprises an analog reference signal, and the analog reference signal comprises a precoded CSI-RS.

In a third aspect, alone or in combination with one or more of the first and second aspects, the precoded CSI-RS is associated with a subset of CSI-RS ports from a plurality of possible CSI-RS ports, wherein a rank is based at least in part on the subset of CSI-RS ports, wherein the PUSCH transmission is transmitted based at least in part on the rank, and process 1100 includes transmitting, to the UE, a DCI to schedule the PUSCH transmission, the DCI excluding the rank.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
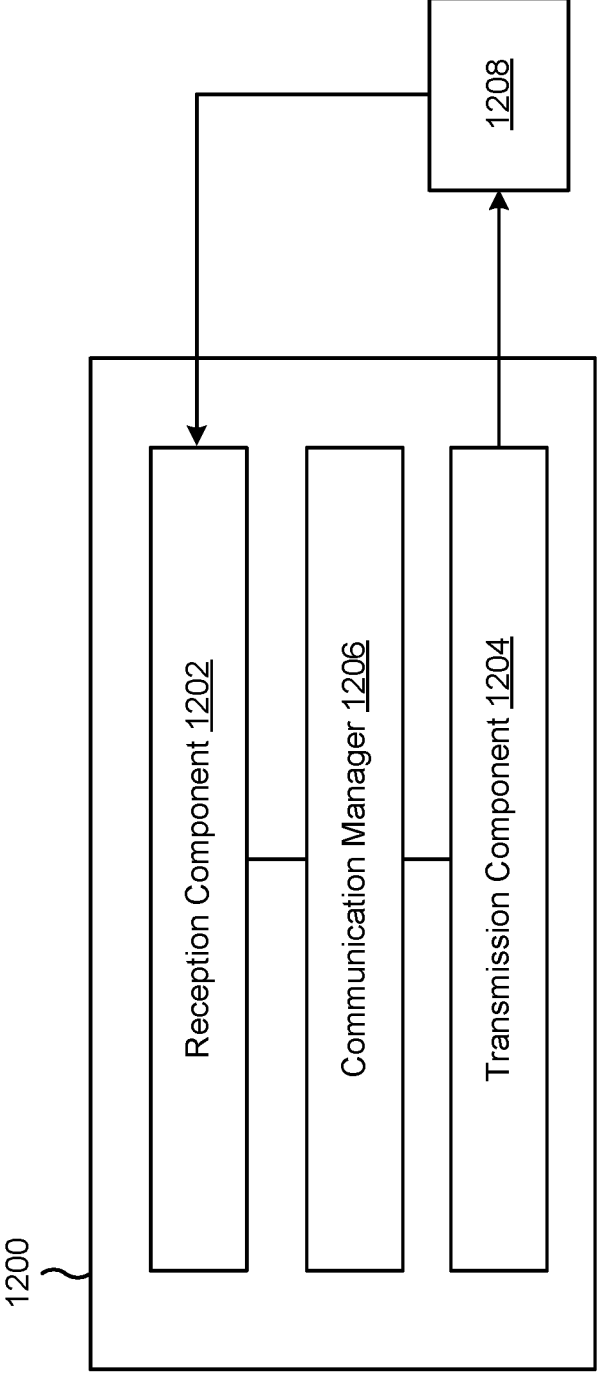
FIGS. 12-13 are diagrams of example apparatuses for wireless communication, in accordance with the present disclosure.

FIG. 12 is a diagram of an example apparatus 1200 for wireless communication, in accordance with the present disclosure. The apparatus 1200 may be a UE, or a UE may include the apparatus 1200. In some aspects, the apparatus 1200 includes a reception component 1202, a transmission component 1204, and/or a communication manager 1206, which may be in communication with one another (for example, via one or more buses and/or one or more other components). In some aspects, the communication manager 1206 is the communication manager 140 described in connection with FIG. 1. As shown, the apparatus 1200 may communicate with another apparatus 1208, such as a UE or a network node (such as a CU, a DU, an RU, or a base station), using the reception component 1202 and the transmission component 1204.

In some aspects, the apparatus 1200 may be configured to perform one or more operations described herein in connection with FIGS. 4-9. Additionally, or alternatively, the apparatus 1200 may be configured to perform one or more processes described herein, such as process 1000 of FIG. 10. In some aspects, the apparatus 1200 and/or one or more components shown in FIG. 12 may include one or more components of the UE described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1208. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the UE described in connection with FIG. 2.

The transmission component 1204 may transmit communications, such as reference signals, control information, data communications, or a combination thereof, to the apparatus 1208. In some aspects, one or more other components of the apparatus 1200 may generate communications and may provide the generated communications to the transmission component 1204 for transmission to the apparatus 1208. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1208. In some aspects, the transmission component 1204 may include one or more antennas, a modem, a modulator, a transmit MIMO processor, a transmit processor, a controller/processor, a memory, or a combination thereof, of the UE described in connection with FIG. 2. In some aspects, the transmission component 1204 may be co-located with the reception component 1202 in a transceiver.

The communication manager 1206 may support operations of the reception component 1202 and/or the transmission component 1204. For example, the communication manager 1206 may receive information associated with configuring reception of communications by the reception component 1202 and/or transmission of communications by the transmission component 1204. Additionally, or alternatively, the communication manager 1206 may generate and/or provide control information to the reception component 1202 and/or the transmission component 1204 to control reception and/or transmission of communications.

The reception component 1202 may receive, from a network node, an analog precoding matrix indication. The transmission component 1204 may transmit, to the network node, a PUSCH transmission based at least in part on a precoding matrix, wherein the precoding matrix is based at least in part on the analog precoding matrix indication.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
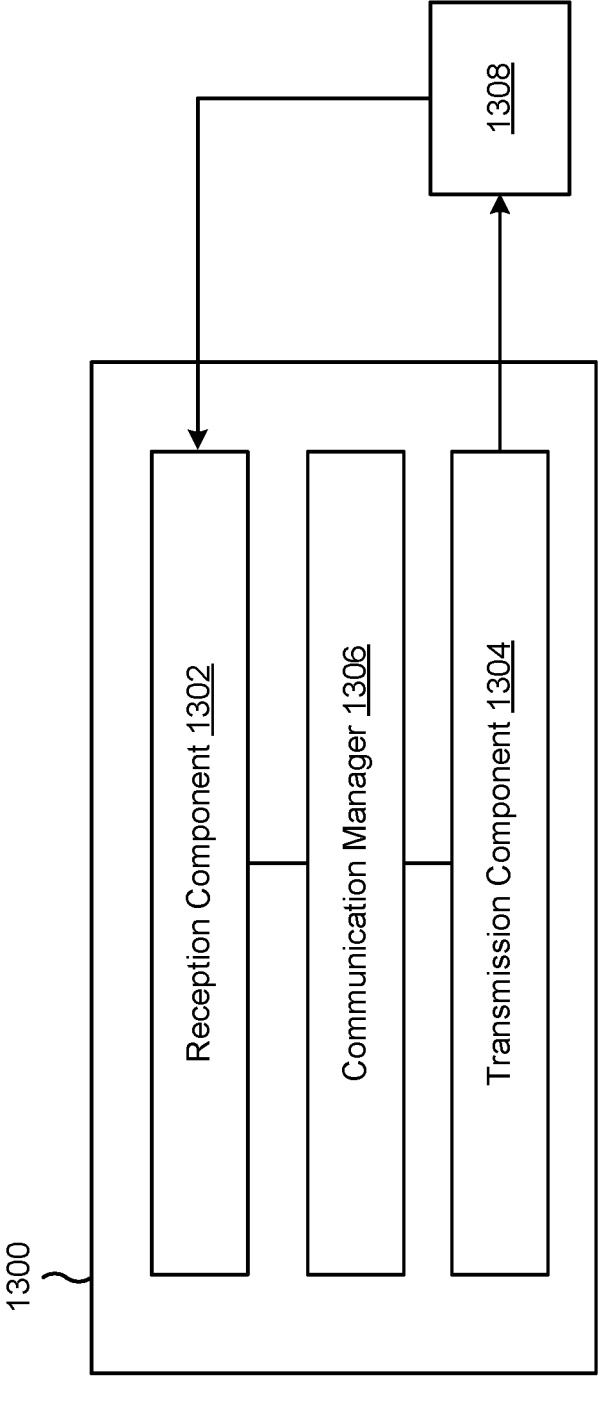

FIG. 13 is a diagram of an example apparatus 1300 for wireless communication, in accordance with the present disclosure. The apparatus 1300 may be a network node, or a network node may include the apparatus 1300. In some aspects, the apparatus 1300 includes a reception component 1302, a transmission component 1304, and/or a communication manager 1306, which may be in communication with one another (for example, via one or more buses and/or one or more other components). In some aspects, the communication manager 1306 is the communication manager 150 described in connection with FIG. 1. As shown, the apparatus 1300 may communicate with another apparatus 1308, such as a UE or a network node (such as a CU, a DU, an RU, or a base station), using the reception component 1302 and the transmission component 1304.

In some aspects, the apparatus 1300 may be configured to perform one or more operations described herein in connection with FIGS. 4-9. Additionally, or alternatively, the apparatus 1300 may be configured to perform one or more processes described herein, such as process 1100 of FIG. 11. In some aspects, the apparatus 1300 and/or one or more components shown in FIG. 13 may include one or more components of the network node described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1308. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the network node described in connection with FIG. 2. In some aspects, the reception component 1302 and/or the transmission component 1304 may include or may be included in a network interface. The network interface may be configured to obtain and/or output signals for the apparatus 1300 via one or more communications links, such as a backhaul link, a midhaul link, and/or a fronthaul link.

The transmission component 1304 may transmit communications, such as reference signals, control information, data communications, or a combination thereof, to the apparatus 1308. In some aspects, one or more other components of the apparatus 1300 may generate communications and may provide the generated communications to the transmission component 1304 for transmission to the apparatus 1308. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1308. In some aspects, the transmission component 1304 may include one or more antennas, a modem, a modulator, a transmit MIMO processor, a transmit processor, a controller/processor, a memory, or a combination thereof, of the network node described in connection with FIG. 2. In some aspects, the transmission component 1304 may be co-located with the reception component 1302 in a transceiver.

The communication manager 1306 may support operations of the reception component 1302 and/or the transmission component 1304. For example, the communication manager 1306 may receive information associated with configuring reception of communications by the reception component 1302 and/or transmission of communications by the transmission component 1304. Additionally, or alternatively, the communication manager 1306 may generate and/or provide control information to the reception component 1302 and/or the transmission component 1304 to control reception and/or transmission of communications.

The transmission component 1304 may transmit, to a UE, an analog precoding matrix indication. The reception component 1302 may receive, from the UE, a PUSCH transmission based at least in part on a precoding matrix, wherein the precoding matrix is based at least in part on the analog precoding matrix indication.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed by a user equipment (UE), comprising: receiving, from a network node, an analog precoding matrix indication; and transmitting, to the network node, a physical uplink shared channel (PUSCH) transmission based at least in part on a precoding matrix, wherein the precoding matrix is based at least in part on the analog precoding matrix indication.

Aspect 2: The method of Aspect 1, further comprising: receiving, from the network node, a downlink control information (DCI) that includes one or more bits to digitally indicate a rank, wherein the rank is associated with a digital signaling from the network node, and wherein the PUSCH transmission is transmitted based at least in part on the rank.

Aspect 3: The method of Aspect 2, wherein receiving the DCI comprises receiving a first DCI and a second DCI, and wherein the first DCI is associated with a first antenna group and the second DCI is associated with a second antenna group.

Aspect 4: The method of any of Aspects 1-3, wherein the analog precoding matrix indication comprises an analog reference signal.

Aspect 5: The method of claim 4, wherein the analog reference signal comprises a precoded channel state information reference signal (CSI-RS).

Aspect 6: The method of claim 5, wherein the one or more processors, to receive the precoded CSI-RS, are configured to receive a first precoded CSI-RS and a second precoded CSI-RS, and wherein the first precoded CSI-RS is associated with the first antenna group and the second precoded CSI-RS is associated with the second antenna group.

Aspect 7: The method of claim 5, further comprising: transmitting, to the UE, an unprecoded sounding reference signal (SRS), wherein the precoded CSI-RS is based at least in part on the unprecoded SRS.

Aspect 8: The method of claim 5, wherein the precoded CSI-RS is associated with a subset of CSI-RS ports from a plurality of possible CSI-RS ports, wherein a rank is based at least in part on the subset of CSI-RS ports, and wherein the PUSCH transmission is transmitted based at least in part on the rank, wherein the one or more processors are further configured to receive, from the network node, a downlink control information (DCI) to schedule the PUSCH transmission, the DCI excluding the rank.

Aspect 9: The method of any of Aspects 1-8, further comprising: estimating a channel between the UE and the network node based at least in part on the analog precoding matrix indication received from the network node; and determining the precoding matrix to be applied by the UE based at least in part on the estimated channel between the UE and the network node.

Aspect 10: The method of any of Aspects 1-9, wherein the analog precoding matrix indication and the PUSCH transmission are separated by a threshold time, and wherein the threshold time is based at least in part on a predefinition, UE capability signaling, or a radio resource control (RRC) configuration by the network node.

Aspect 11: The method of any of Aspects 1-10, wherein a downlink channel between the UE and the network node is reciprocal to an uplink channel between the UE and the network node.

Aspect 12: A method of wireless communication performed by a network node, comprising: transmitting, to a user equipment (UE), an analog precoding matrix indication; and receiving, from the UE, a physical uplink shared channel (PUSCH) transmission based at least in part on a precoding matrix, wherein the precoding matrix is based at least in part on the analog precoding matrix indication.

Aspect 13: The method of Aspect 11, further comprising: receiving, from the network node, a downlink control information (DCI) that includes one or more bits to digitally indicate a rank, wherein the rank is associated with a digital signaling to the UE, and wherein the PUSCH transmission is transmitted based at least in part on the rank.

Aspect 14: The method of any of Aspects 12-13, wherein the analog precoding matrix indication comprises an analog reference signal, and wherein the analog reference signal comprises a precoded channel state information reference signal (CSI-RS).

Aspect 15: The method of any of Aspects 12-13, wherein the precoded CSI-RS is associated with a subset of CSI-RS ports from a plurality of possible CSI-RS ports, wherein a rank is based at least in part on the subset of CSI-RS ports, wherein the PUSCH transmission is transmitted based at least in part on the rank, and wherein the one or more processors are further configured to transmit, to the UE, a downlink control information (DCI) to schedule the PUSCH transmission, the DCI excluding the rank.

Aspect 16: An apparatus for wireless communication at a device, comprising a processor; memory coupled with the processor; and instructions stored in the memory and executable by the processor to cause the apparatus to perform the method of one or more of Aspects 1-11.

Aspect 17: A device for wireless communication, comprising a memory and one or more processors coupled to the memory, the one or more processors configured to perform the method of one or more of Aspects 1-11.

Aspect 18: An apparatus for wireless communication, comprising at least one means for performing the method of one or more of Aspects 1-11.

Aspect 19: A non-transitory computer-readable medium storing code for wireless communication, the code comprising instructions executable by a processor to perform the method of one or more of Aspects 1-11.

Aspect 20: A non-transitory computer-readable medium storing a set of instructions for wireless communication, the set of instructions comprising one or more instructions that, when executed by one or more processors of a device, cause the device to perform the method of one or more of Aspects 1-11.

Aspect 21: An apparatus for wireless communication at a device, comprising a processor; memory coupled with the processor; and instructions stored in the memory and executable by the processor to cause the apparatus to perform the method of one or more of Aspects 12-15.

Aspect 22: A device for wireless communication, comprising a memory and one or more processors coupled to the memory, the one or more processors configured to perform the method of one or more of Aspects 12-15.

Aspect 23: An apparatus for wireless communication, comprising at least one means for performing the method of one or more of Aspects 12-15.

Aspect 24: A non-transitory computer-readable medium storing code for wireless communication, the code comprising instructions executable by a processor to perform the method of one or more of Aspects 12-15.

Aspect 25: A non-transitory computer-readable medium storing a set of instructions for wireless communication, the set of instructions comprising one or more instructions that, when executed by one or more processors of a device, cause the device to perform the method of one or more of Aspects 12-15.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
 a memory; and
 one or more processors, coupled to the memory, configured to:
  receive, from a network node, a radio resource control (RRC) configuration indicating a threshold time;
  receive, from the network node, an analog precoding matrix indication; and
  transmit, to the network node, a physical uplink shared channel (PUSCH) transmission based at least in part on a precoding matrix, wherein the precoding matrix is based at least in part on the analog precoding matrix indication, wherein a rank value is applied to the PUSCH transmission based at least in part on the PUSCH transmission occurring after the threshold time.

2. The apparatus of claim 1, wherein the one or more processors are further configured to:
 receive, from the network node, a downlink control information (DCI) that includes one or more bits to digitally indicate the rank value, wherein the rank value is associated with a digital signaling from the network node, and wherein the rank value is applied to PUSCH transmissions that occur after the threshold time.

3. The apparatus of claim 2, wherein the one or more processors, to receive the DCI, are configured to receive a first DCI and a second DCI, and wherein the first DCI is associated with a first antenna group and the second DCI is associated with a second antenna group.

4. The apparatus of claim 1, wherein the analog precoding matrix indication comprises an analog reference signal.

5. The apparatus of claim 4, wherein the analog reference signal comprises a precoded channel state information reference signal (CSI-RS).

6. The apparatus of claim 5, wherein the one or more processors, to receive the precoded CSI-RS, are configured to receive a first precoded CSI-RS and a second precoded CSI-RS, and wherein the first precoded CSI-RS is associated with a first antenna group and the second precoded CSI-RS is associated with a second antenna group.

7. The apparatus of claim 5, wherein the one or more processors are further configured to:
 transmit, to the network node, an unprecoded sounding reference signal (SRS), wherein the precoded CSI-RS is based at least in part on the unprecoded SRS.

8. The apparatus of claim 5, wherein the precoded CSI-RS is associated with a subset of CSI-RS ports from a plurality of possible CSI-RS ports, wherein the rank value is based at least in part on the subset of CSI-RS ports, and wherein the one or more processors are further configured to receive, from the network node, a downlink control information (DCI) to schedule the PUSCH transmission, the DCI excluding the rank value.

9. The apparatus of claim 1, wherein the one or more processors are further configured to:

estimate a channel between the UE and the network node based at least in part on the analog precoding matrix indication received from the network node; and determine the precoding matrix to be applied by the UE based at least in part on the estimated channel between the UE and the network node.

10. The apparatus of claim 1, wherein the analog precoding matrix indication and the PUSCH transmission are separated by the threshold time, and wherein the threshold time is based at least in part on capability signaling of the UE.

11. The apparatus of claim 1, wherein a downlink channel between the UE and the network node is reciprocal to an uplink channel between the UE and the network node.

12. The apparatus of claim 1, wherein a lack of an indicator for the precoding matrix in downlink control information (DCI) is an implicit indication that the precoding matrix is to be indicated using an analog signal.

13. The apparatus of claim 1, wherein the threshold time is an amount of time after a transmission of a precoded channel state information reference signal (CSI-RS).

14. An apparatus for wireless communication at a network node, comprising:

a memory; and one or more processors, coupled to the memory, configured to:

transmit, to a user equipment (UE), a radio resource control (RRC) configuration indicating a threshold time;

transmit, to the UE, an analog precoding matrix indication; and receive, from the UE, a physical uplink shared channel (PUSCH) transmission based at least in part on a precoding matrix, wherein the precoding matrix is based at least in part on the analog precoding matrix indication, wherein a rank value is applied to the PUSCH transmission based at least in part on the PUSCH transmission occurring after the threshold time.

15. The apparatus of claim 14, wherein the one or more processors are further configured to:

receive, from the network node, a downlink control information (DCI) that includes one or more bits to digitally indicate the rank value, wherein the rank value is associated with a digital signaling to the UE, and wherein the rank value is applied to PUSCH transmissions that occur after the threshold time.

16. The apparatus of claim 14, wherein the analog precoding matrix indication comprises an analog reference signal, and wherein the analog reference signal comprises a precoded channel state information reference signal (CSI-RS).

17. The apparatus of claim 16, wherein the precoded CSI-RS is associated with a subset of CSI-RS ports from a plurality of possible CSI-RS ports, wherein the rank value is based at least in part on the subset of CSI-RS ports, and wherein the one or more processors are further configured to transmit, to the UE, a downlink control information (DCI) to schedule the PUSCH transmission, the DCI excluding the rank value.

18. A method of wireless communication performed by a user equipment (UE), comprising:

receiving, from a network node, a radio resource control (RRC) configuration indicating a threshold time;

receiving, from the network node, an analog precoding matrix indication; and transmitting, to the network node, a physical uplink shared channel (PUSCH) transmission based at least in part on a precoding matrix, wherein the precoding matrix is based at least in part on the analog precoding matrix indication, wherein a rank value is applied to the PUSCH transmission based at least in part on the PUSCH transmission occurring after the threshold time.

19. The method of claim 18, further comprising:

receiving, from the network node, a downlink control information (DCI) that includes one or more bits to digitally indicate the rank value, wherein the rank value is associated with a digital signaling from the network node, and wherein the rank value is applied to PUSCH transmissions that occur after the threshold time.

20. The method of claim 19, wherein receiving the DCI comprises receiving a first DCI and a second DCI, and wherein the first DCI is associated with a first antenna group and the second DCI is associated with a second antenna group.

21. The method of claim 18, wherein the analog precoding matrix indication comprises an analog reference signal.

22. The method of claim 21, wherein the analog reference signal comprises a precoded channel state information reference signal (CSI-RS).

23. The method of claim 22, wherein receiving the precoded CSI-RS comprises receiving a first precoded CSI-RS and a second precoded CSI-RS, and wherein the first precoded CSI-RS is associated with a first antenna group and the second precoded CSI-RS is associated with a second antenna group.

24. The method of claim 22, further comprising:

transmitting, to the network node, an unprecoded sounding reference signal (SRS), wherein the precoded CSI-RS is based at least in part on the unprecoded SRS.

25. The method of claim 22, wherein the precoded CSI-RS is associated with a subset of CSI-RS ports from a plurality of possible CSI-RS ports, wherein the rank value is based at least in part on the subset of CSI-RS ports, and wherein the method further comprises receiving, from the network node, a downlink control information (DCI) to schedule the PUSCH transmission, the DCI excluding the rank value.

26. The method of claim 18, further comprising:

estimating a channel between the UE and the network node based at least in part on the analog precoding matrix indication received from the network node; and determining the precoding matrix to be applied by the UE based at least in part on the estimated channel between the UE and the network node.

27. The method of claim 18, wherein the analog precoding matrix indication and the PUSCH transmission are separated by the threshold time, and wherein the threshold time is based at least in part on capability signaling of the UE.

28. The method of claim 18, wherein a downlink channel between the UE and the network node is reciprocal to an uplink channel between the UE and the network node.

29. A method of wireless communication performed by a network node, comprising:

transmitting, to a user equipment (UE), a radio resource control (RRC) configuration indicating a threshold time;

transmitting, to the UE, an analog precoding matrix indication; and receiving, from the UE, a physical uplink shared channel (PUSCH) transmission based at least in part on a precoding matrix, wherein the precoding matrix is based at least in part on the analog precoding matrix indication, wherein a rank value is applied to the PUSCH transmission based at least in part on the PUSCH transmission occurring after the threshold time.

30. The method of claim 29, further comprising:

receiving, from the network node, a downlink control information (DCI) that includes one or more bits to digitally indicate the rank value, wherein the rank value is associated with a digital signaling to the UE, and wherein the rank value is applied to PUSCH transmissions that occur after the threshold time.

36

* * * * *